3,085,911
PROCESS FOR GLUEING FIBERS, FILLERS, AND OBJECTS MADE OF THE SAME
Curt Walther Leupold and Rolf Mohr, Nurnberg, and Kurt Hermann Sponsel, Krefeld, Germany, assignors to Vereinigte Papierwerke Schickedanz & Company, Nurnberg, Germany, a corporation of Germany
No Drawing. Filed Jan. 14, 1959, Ser. No. 786,694
1 Claim. (Cl. 117—140)

It is known that within a suitable pH range di- or poly-epoxy resins form a solid, horny, bulky compound with textile fibers, staple fibers or rayon fibers, which is water-repellent as well as resistant to water and chemicals. Resins suited to this purpose are the polyester ethoxylene resins, prepared from polyesters such as adipic acid polyglycol ester resins, fumaric acid-sorbitol ester resins and polyurethane resins, which have been reacted with allyl glycidyl ethers and contain several free epoxy groups in the molecule.

The affinity of these resins for fibrous materials can be improved as a result of the incorporation therein of amines, imines or other appropriate groups, but these modifications produce a hard cement.

When aminoplasts, such as dimethylolurea or water-soluble urea formaldehyde resins, are employed alone to cement fibers or fiber structures, water-repellent, brittle glued bodies result. Therefore the present inventors' discovery that rubbery, elastic, wettable structures result from the use of mixtures of aminoplasts and polyester ethoxylene resins to cement fibers and fillers is indeed surprising and could not have been predicted from what was previously known about these materials.

This new process is of great technical importance since as a result of the fiber affinity of mixtures of polyester ethoxylene resins and dimethylolurea or melamine- or urea-formaldehyde resins, a very dilute aqueous solution of such mixtures can be used to produce an elastic cross linkage, i.e. a glueing together that resists water and chemicals. Fillers, such as kaolin, bentonite and illite, can be added to the mixtures. Dye-stuffs, such as titanium dioxide and/or thickeners such as methyl cellulose or starch ethers, can be added.

The above-mentioned mixtures are suitable for the manufacture of products which are stable to water and chemicals, such as paper or fleeces of cellulose, of staple fiber or of rayon fiber and the like. The mixtures are also useful in the making of plastics and semi-manufactured plastics, such as tubes, bars, sheets and castings.

*Example 1*

A foaming solution is prepared having a pH of 7.6–8.0, and consisting of:

A. 1 part by weight of methyl cellulose,
B. 1 part by weight of a polyester triethoxylene resin made from:
   9 mols of butene-2-diol-(1:4),
   9 mols of fumaric acid,
   1 mol of triethanolamine, and
   3 mols of epichlorohydrin,
C. 0.1 part by weight of dimethylolurea, and
D. 0.01 part by weight of a polyglycol ether as a foaming agent.

The above foaming solution is doctored onto a fiber fleece, which is made of staple fiber produced by carding and which possesses a weight of approximately 20 grams per square meter. After drying, the mixture is heated to 130° for a short time to set it; this can be done within three seconds by hot calendering.

The fiber fleece produced is readily wettable, exhibits a breaking length of about 1.2 kilometers in the dry state, and possesses approximately the same wet strength even after storage in water for 24 hours. It does not lose strength after boiling for 10 hours in 4 percent caustic soda solution or after boiling for two hours in 10 percent formic acid.

*Example 2*

One thousand parts by weight of kaolin are added to 3000 parts by weight of water on a filter and stirred. To the above mixture is first added 40 parts by weight of the product which results from the reaction of 5 mols of allyl glycidyl ether with the condensation product of 9 mols of ethylene imine, 18 mols of maleic anhydride and 10 mols of sorbitol. To the above aqueous resin-filler mixture is added 20 parts by weight of urea adhesive.

The resultant mixture settles on the kaolin, causing the kaolin paste to settle in coarse flakes. After removal of excess water, the filter residue is poured into forms, such as plates or pots, while still moist and is left to harden in the air. Three weeks of storage yield, for example, a waterproof plate.

We claim:
A method of treating fibers to produce hydrophilic rubbery bonds therebetween, comprising: preparing a foaming solution consisting of (A) 1 part by weight methyl cellulose, (B) 1 part by weight of a polyester triethoxylene resin which has been made from 9 mols of butene-2-diol-(1:4), 9 mols of fumaric acid, 1 mol of triethanolamine and 3 mols of epichlorohydrin, (C) 0.1 part by weight of an aminoplast, and (D) 0.01 part by weight of a polyglycol ether as a foaming agent; doctoring the said foaming solution onto a carded, staple fiber fleece; drying the fleece-resin composite thus produced; and heating the dried composite to set it.

References Cited in the file of this patent
UNITED STATES PATENTS 2,819,238   Hart et al. _____ Jan. 7, 1958
2,872,427   Schroeder _____ Feb. 3, 1959

OTHER REFERENCES

Chemical Week, vol. 69, page 27, for September 8, 1951.